United States Patent [19]

Weis

[11] Patent Number: 4,861,472

[45] Date of Patent: Aug. 29, 1989

[54] APPARATUS FOR FILTRATION OF A SUSPENSION

[75] Inventor: Frank G. Weis, Kansas City, Mo.

[73] Assignee: Smith & Loveless, Inc., Lenexa, Kans.

[21] Appl. No.: 219,078

[22] Filed: Jul. 14, 1988

[51] Int. Cl.$^4$ ............................................. B01D 29/08
[52] U.S. Cl. .................................... 210/189; 210/268; 210/269; 210/285
[58] Field of Search ............................... 210/792–796, 210/807, 189, 268, 269, 285, 286

[56] References Cited

U.S. PATENT DOCUMENTS 3,563,385  2/1971  Bykov ................................. 210/268
4,126,546  11/1978  Hjelmner et al. .................. 210/793

*Primary Examiner*—Ivars Cintins
*Attorney, Agent, or Firm*—Dressler, Goldsmith, Shore, Sutker & Milnamow, Ltd.

[57] ABSTRACT

The invention relates to a self-cleaning filter in which the suspension to be filtered is introduced into the filter media at a lower portion of the apparatus. The dirtied filter media flows out the bottom of the apparatus by gravity, while the material being filtered flows upwardly through the filter media into an annular chamber, over a weir and out an outlet pipe. The dirty filter media is mixed with clarified liquid that is received from a confined chamber in the upper portion of the filtering apparatus and the slurry so formed flows into the inlet of a pump. The pump scours the material acting to partially separate the liquid and particulate from the filter material. The slurry is then pumped up into a separator wherein further separation takes place with the liquid and particulate matter being directed out of the separator back for reprocessing and the clean filter medium is reintroduced into the filtering apparatus.

7 Claims, 1 Drawing Sheet

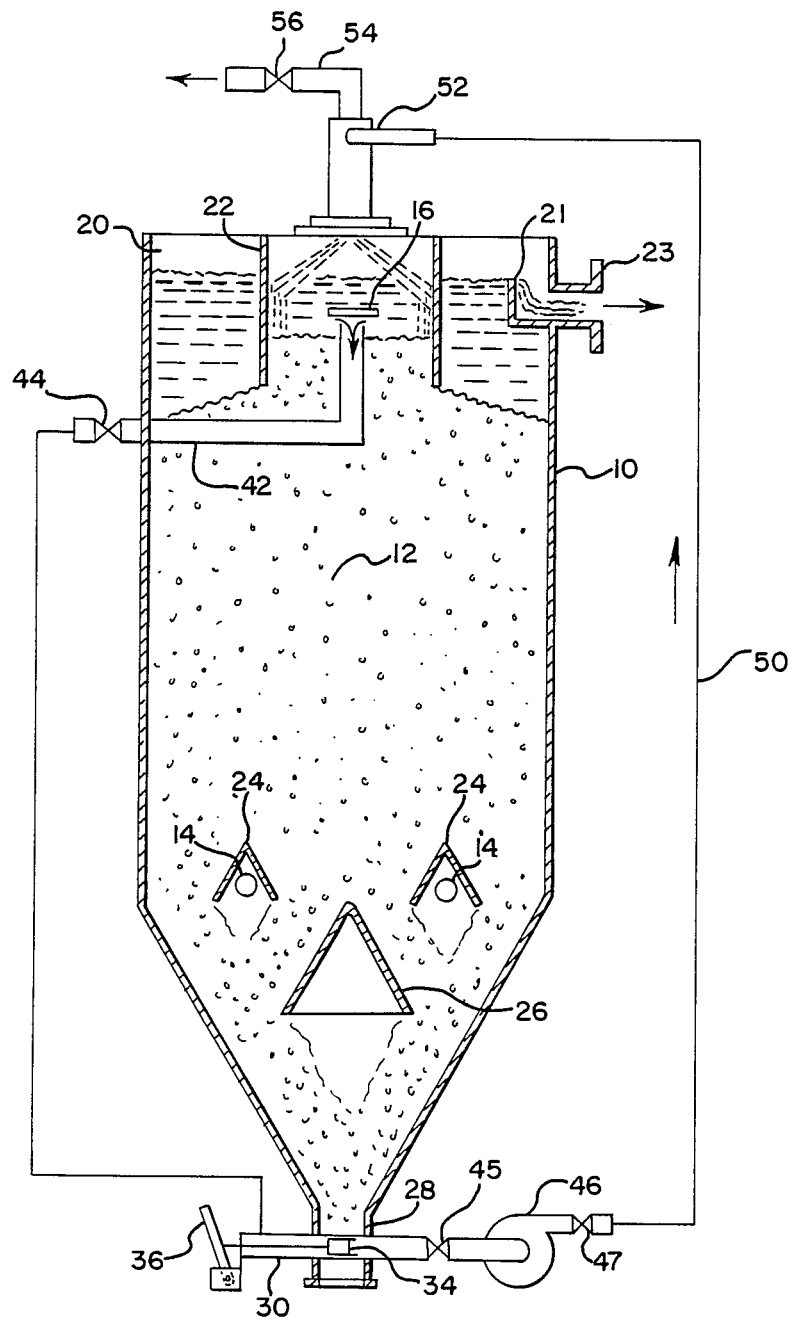

APPARATUS FOR FILTRATION OF A SUSPENSION

The present invention relates to an apparatus for the filtration of a liquid containing suspension, emulsion, or other material to be filtered.

It is well-known to have self-cleaning filters in which the filter media containing particulate matter is removed and continuously cleaned, and cleaned filter media returned to the filter. With this kind of an arrangement, it is possible to clean the filter media without having to shut the system down. One arrangement that is currently being used is of the type that employs an air lift to transport the contaminated filter media to be washed up into the upper portion of the filtering apparatus. The filter media to be cleaned is moved in a countercurrent direction with a washing liquid, such as the liquid that has been filtered by passing the liquid upwards through the filter medium. Such an arrangement is disclosed in U.S. Pat. No. 4,126,546.

Essentially, the way this type of arrangement works is to circulate contaminated filter media with an air lifting arrangement to air lift the contaminated media from the bottom of the filter to the top of the filter. The washing is primarily accomplished by having the media fall through a rising previously filtered liquid which is in a countercurrent direction to the filter media being cleaned.

Another way of doing this is to employ air lifts that use a screw auger to clean the media as the media is augered into the filter. The air lift pumps the media into the auger. This results in better cleaning than a conventional air lift arrangement, but presents increased operational and maintenance problems. Another problem with air lifts is the control of rate of circulation. An air lift has a minimum flow rate that is fairly high. Trying to reduce the flow rate causes the air lift to cease operating. Also, if the air lift is not operating for a period of time, the media packs and the air lift has no ability to loosen the media and cause it to flow. This requires lancing the unit with a separate air source.

Futhermore, these types of existing self-cleaning filters have all of their working parts within the filter. It is impossible to observe operation of these parts to adjust, maintain, and so forth, the filtering apparatus.

While the air lift-type filters have achieved a modicum of success, they often result in some of the media not being cleaned, and there also clearly exists the possibility that some of the particulate matter may find its way back into the filter where it is free to pass out with the effluent. Also, filters using air lifts to transport the filter media for washing may blow air back into the filter if the air lift plugs. The wash water flow is not constant and varies according to the flow of the filter.

Furthermore, since the typical air lift system is located totally internally of the filtering apparatus, it is not readily accessible for repair or maintenance.

In accordance with the present invention, there is disclosed a novel filtering apparatus which is but one way of performing the novel method also claimed herein. There is provided a conventional housing in which material, such as a suspension or emulsion. to be filtered is directed into the lower portion of the housing. The liquid suspension to be filtered flows upwardly through the filtering medium at the same time that the filter medium moves by gravity downwardly to an outlet located at the bottom of the filter housing. Thus, the contaminated filter media is constantly flowing out of the bottom of the filtering apparatus. The dirtiest filter medium continues downward and is no longer used for the filtration. New filter medium is always exposed to the incoming liquid suspension. Essentially, the liquid suspension to be filtered flows upwards countercurrent to the filter media towards more and more clean filter media.

Located in the housing outlet is a valve which controls the outlet opening and thus regulates the amount of dirty filter medium to be cleaned during any given interval. The valve includes an operating mechanism so that the flow rate of the medium can be readily adjusted.

The filtering apparatus contains at its upper portion a confined chamber that is located in the central portion thereof. This chamber is sealed off from an adjacent annular chamber by filter media, which annular chamber contains the clarified liquid that flows therefrom over a weir to an outlet for reuse. The confined chamber receives clarified liquid which flows through the filter media, but fluid that flows into the chamber from any other source will be prevented from flowing to the outlet pipe by the filter media sealing off the bottom of the chamber.

The liquid in this confined chamber is used for washing the contaminated filter media. This liquid flows through first conduit means that connects the chamber to the housing outlet to pick up the filter medium to be cleaned. The liquid and contaminated filter media are then conveyed to a pump where the contaminated filter media is scoured. The slurry including filter media, particulates, and liquid is pumped through second conduit means into a separator located above the housing where the confined chamber is located. The separator further scours the material it receives and directs the cleaned filter media back into the confined chamber and the liquid containing particulate matter is directed out for further treatment before it is again introduced back into the filtering apparatus. The utilization of this collection chamber for the clean media provides for the dispersement of the clean media over a large area to facilitate uniform dispersal of the media back into the filtering apparatus.

A structure by which the above and other advantages of the invention are attained will be described in the following specification taken in conjunction with the accompanying drawing illustrating a preferred structural embodiment of the invention in which:

The single FIGURE in this application shows a cross-sectional view of the novel filtering apparatus.

The filtering apparatus includes a housing 10 having a conical-shaped bottom in which is located the filter media 12. This filter media is located in the lower approximately 80% of the housing, which is by way of example only. The filter media has the desired particle size and may be sand or other suitable filtering material, and functions to filter the suspension introduced into the filtering apparatus into a clarified liquid and particulates filtered out of the suspension. One skilled in the art can readily determine the most suitable material and grain size in each particular case.

The liquid suspension to be filtered enters the housing through the inlets 14 and flows into the filter medium 12 and upwardly therethrough. During the flow of the liquid suspension through the filter, the suspended particulates to be filtered cling to the filter medium and the filtered liquid flows into the central confined chamber 16 and surrounding annular chamber 20 located above the filter media. The central chamber 16 is defined by the filter media 12 and a cylindrical wall 22. The level of the filter media in said chamber 16 is above the bottom of the wall 22 to prevent the flow of liquid between chambers 16 and 20 for reasons which will be discussed hereinafter. The clarified liquid in chamber 20 flows over weir 21 and out outlet 23. Located above the inlets 14 are "V"-shaped hat sections 24 that insure that there is a space free of filter media below the inlets to freely admit the suspension to be filtered into the housing. These hat sections 24 also provide for uniform flow of the filter media toward the bottom of the housing. The inlets 14 and associated hat sections are located throughout the filter to provide for proper distribution of the liquid suspension to be filtered throughout the media.

Additionally, there is a pyramid section 26 located beneath the inlets 14 which creates uniform flow of filter media throughout the filter bed. The filter media picks up the material that is filtered, such as particulates, and flows by gravity out through the outlet 28 located at the bottom of the housing 10. The outlet opening 28 is in fluid communication with a conduit 30. The size of the opening 28, which determines the flow of contaminated media out of the housing, is controlled by a suitable slide valve 34 that is regulated by the handle mechanism 36. Thus, the movement of the handle 36 will determine the amount of contaminated filter media that is introduced into the conduit 30.

Thus, as previously stated, the contaminated filter media moves downward and is no longer used for filtration, with the result that new uncontaminated filter media is always exposed to the incoming liquid suspension being filtered.

The wash liquid for washing the filter media is taken from the combined chamber 16 located above the filter media in the upper central portion of the housing. This chamber primarily includes liquid that has been clarified by its movement upwardly through the filter media. The washing liquid flows by gravity through a conduit 42 which is in fluid communication with the conduit 30. A control valve 44 controls the flow of liquid in conduit 42. The clarified effluent in conduit 42 is then mixed with the contaminated filter media that enters conduit 30 from the housing 10, and the slurry flows through the conduit 30 to a centrifugal pump 46. Valves 45 and 47 are provided to isolate pump 46 and to control the circulating flow rate through the system. In this pump 46, the slurry made up of clarified liquid, filter media, and particulate filtered out from the suspension is scoured for the first time, and the slurry is then pumped up through a conduit 50 to a suitable separator 52 of well-known construction. The swirling action in the pump causes the media to scrub itself against each other. The media passes into the pipe 50 where the particulates are washed and separated from the media as the velocity of flow past the media is greater than the velocity past the particulates, so the particulates are carried away from the media.

In the separator 52, high gravity forces plus scouring further classify the media and the particulates and the liquid containing particulate matter is directed out through pipe 54 for further treatment, which is controlled by valve 56. The cleaned filter media separated out by the separator is redirected into the chamber 16 for distribution over a large area of the filter bed. Since, as aforementioned, this chamber 16 is sealed off from the chamber 20 surrounding the wall 22, the liquid located therein will not mix with the clarified liquid in chamber 20, and thus if there is any particulate matter that is contained therein it will not be introduced into the clarified liquid being directed over the weir 21 and out the outlet 23. The upflow of liquid in chamber 16 prevents any of the escaped particulates from moving into the filter bed.

The operation of the novel method of the present invention is as follows:

The material to be filtered, such as a liquid suspension or emulsion, is introduced into the filter media 12 through the inlets 14. The liquid suspension moves upwardly through the filter media, and clarified liquid flows into the chambers 16 and 20 located above the filter media. During this filtration process, contaminated filter media moves by gravity out the bottom of the apparatus where it is mixed with clarified liquid and subsequently cleaned and reintroduced into the filtration apparatus. The washing occurs by taking clarified liquid from a central chamber 16 located above the filter media and directing it through conduit means 42, 30, 50 during the cleaning process. In conduit 30, the clarified liquid is mixed with contaminated filter media and the slurry so formed is introduced into a pump 46 where it is scoured and then through conduit 50 to a separator 52 located above the central chamber 16. The further scouring of the slurry takes place in the separator 52. From the separator, the liquid containing the foreign matter is directed outwardly of the system for further treatment and returned to the filtration apparatus through inlets 14, and the clean filter media is returned to chamber 16 of the filtration apparatus.

The circulation flow rate can be adjusted by the various control valves as can the media circulation. Further, the return of liquid into the filtration apparatus can be adjusted by valve 56 and other valves which may be associated with additional suitable treatment apparatus (not shown) associated with such return liquid. All of these can be controlled separately.

Thus, there is provided a novel method and apparatus for recirculating and cleaning a filter media for reuse on a continuous basis.

It is intended to cover by the following claims all embodiments that fall within the true spirit and scope of the invention.

What is claimed is:

1. A filtration apparatus, comprising: a housing defined a lower zone for containing a filter bed of particle filter media and an upper zone for receipt of filtered liquid passing through said filter bed thereinto; a bed of particle filter media in said lower zone; an inlet means extending into a lower portion of said filter bed for directing a liquid suspension to be filtered upwardly through said filter bed into said upper zone; a filtered liquid outlet means for withdrawing filtered liquid from said upper zone; a filter media outlet means for withdrawing particulate containing filter media from a bottom portion of said lower zone; a valve means for controlling the flow of particulate containing filter media through said filter media outlet means; first transfer conduit means having a first end in fluid communication with the filtered liquid in said upper zone and a second end in fluid communication with said filter media outlet means for mixing filtered liquid with the withdrawn particulate containing filter media; pump means in fluid communication with said filter media outlet means for scouring the mixed filtered liquid and particulate containing filter media received from said filter media outlet means and pumping same into a first end of second transfer conduit means; separator means having an inlet in fluid communication with a second end of said second transfer conduit means for separating filter media and liquid containing filtered particulates therein, said separator means having a first outlet means for withdrawing the liquid containing filtered particulates and a second outlet means for withdrawing the separated filter media and returning cleaned filter media to said filter bed in said lower zone.

2. Filtration apparatus as set forth in claim 1 which includes wall means defining a filtered liquid containing chamber within said upper zone which is sealed off at its lower end by filter media in an upper portion of said upper zone, said first end of said first transfer conduit means being in fluid communication with said chamber.

3. Filtration apparatus as set forth in claim 2 in which said valve means comprises a slide valve for controlling the flow of filter media and particulates into said first transfer conduit means.

4. Filtration apparatus as set forth in claim 3 in which there is provided in said housing baffle means surrounding said inlet means for providing uniform flow of the filter media around said inlets and for permitting the liquid suspension to be freely introduced into said filter bed.

5. Filtration apparatus as set forth in claim 2 wherein said separator means is located above said chamber and said second outlet means is in fluid communication with said chamber.

6. Filtration apparatus as set forth in claim 1 in which said pump means includes means to cause the filter media to scrub itself against each other to assist in separating the particulate matter therefrom whereby the velocity of flow past the filter media is greater than the velocity past the particulate so that the particulate is carried away from the filter media.

7. Filtration apparatus as set forth in claim 6 in which said separator means further includes means to separate the filter media and the particulates by the application of high gravity forces and a scouring action.

* * * * *